Sept. 23, 1941.   J. A. PARSONS   2,257,067
METHOD AND APPARATUS FOR MAKING CASEIN PLASTICS
Filed Dec. 7, 1937

Inventor
John A. Parsons
By Foster + Codier
Attorneys

Patented Sept. 23, 1941

2,257,067

UNITED STATES PATENT OFFICE 2,257,067

METHOD AND APPARATUS FOR MAKING CASEIN PLASTICS

John A. Parsons, Bainbridge, N. Y., assignor to American Plastics Corporation, New York, N. Y., a corporation of New York Application December 7, 1937, Serial No. 178,588

6 Claims. (Cl. 18—12)

The present invention relates to making a mottled casein plastic, in which the mottling is more or less spirally arranged, by means of a screw-operated extrusion press.

The extrusion presses are well known in making casein plastics, but heretofore it has been the practice to so operate the screw press as to give a substantially complete blending of the casein mass, or if desired to give an irregular mottling effect, during the operation of feeding the moist casein through the extrusion press. In the customary operation of a screw fed extrusion press, moist casein, usually mixed with fillers, pigments, or dyes, is fed in at the inlet end of the screw, through a suitable hopper, the material being urged forward by the screw, and after leaving the screw, the material passes through a converging portion of the chamber of the extrusion machine, in which it passes through a plurality of perforated plates, commonly called "screens" in the industry, the screens ordinarily being stationary and being supported in the casing of the press.

In accordance with the present invention, it is convenient to add separately to the hopper of the screw press, two differently colored batches of moist casein. One of these may be simply rennet casein in a powdery to granular condition, carrying 20 to 33% of water, which has not previously been plasticized. Into this there may be well mixed, pigments, dyes, fillers and the like, or for some purposes this mass may be free from colors added, to give the natural color of the casein. The other batch of material is solid plasticized extruded casein mass, which has been comminuted to small pieces which will pass a one-quarter inch mesh screen, this being of a different color from that referred to above, for forming colored streaks in the extruded mass, for giving the mottled effect.

Figure 1:
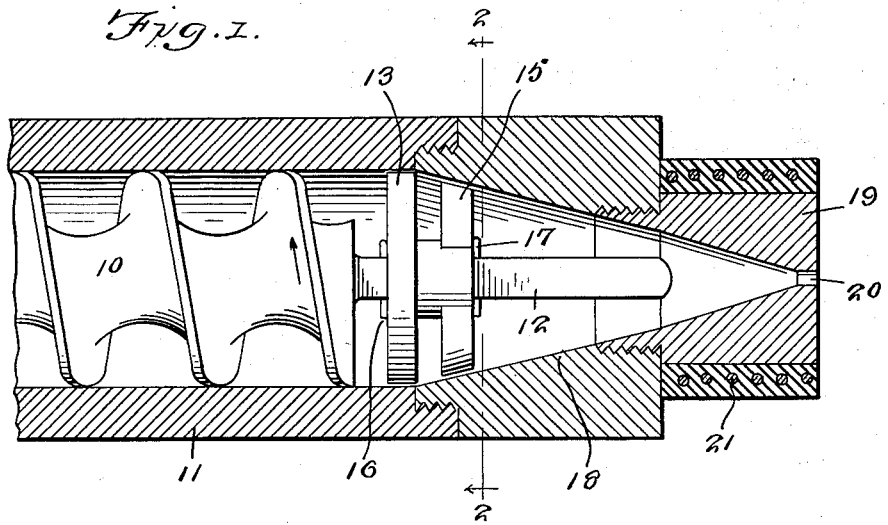
Figure 2:
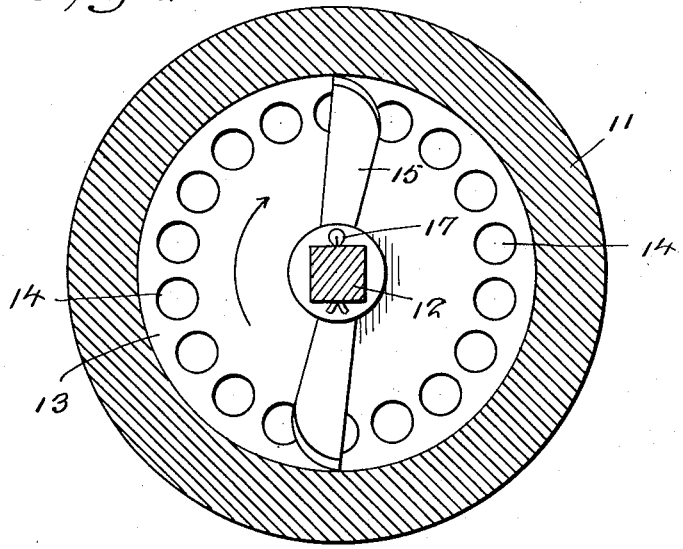

In the accompanying drawing, I have shown a modification of the usual screw fed extrusion press, for use in practicing this invention. In said drawing, Figure 1 is a vertical section showing the latter part of the screw and its casing, together with the tapering portions of the said extrusion press. Figure 2 is an elevation, on a somewhat larger scale, showing the extrusion plate and the rotary agitator.

The feed screw 10 is carried in casing 11, and is operated in any suitable manner. 12 is a shaft or projection located axially in the end of the screw 10 and rigidly secured thereto. A plate 13 may be carried on the shaft 12 and revolvably therewith, this being provided with a row of holes 14, through which the casein mass under treatment is forced. 15 is a rotary impeller and agitating device, which with the perforations in the plate 13 (if used) produces a certain amount of mixing of the materials of the two colors, to give the mottling effect.

The shaft 12 is preferably square in cross-section, and the elements 13 and 15 are rigidly attached thereto, by suitable means such as the keys 16 and 17.

In some cases it may be advisable to provide a plurality of plates 13 and a plurality of rotary agitators 15, to give the desired fineness of the mottling.

The casing 11 is continued in the blocks 18 and 19 which are firmly attached to each other and to the end of casing 11. 20 is the outlet for the extruded and mottled casein mass, and of course the size of the opening 20 controls the size of the rod being made.

At 21 is illustrated an electrical heater for controlling the temperature in the inner surface of the block 19, heat applied at 19 helps to give a smooth surface to the extruded rod. The opening 20 can of course be circular or can be of another shape such as hexagonal or octagonal, to give a rod of the desired shape.

The rod extruded at 20, can be cut up into disks, cutting across the axis of this rod, and the disks will be found to show the spiral mottling above referred to.

Heating and/or cooling can of course be applied to portions of the length of casing 11, and if desired may also be applied to the section 18. In operation, the two different masses as indicated above are supplied to the hopper of the extrusion press, preferably in small quantities. For example a cupful of the moist casein powder (colored or not) may be put into the hopper, and when this has been largely taken up into the screw, a quantity of the extruded casein mass of a different color can similarly be applied, then the two materials fed at short intervals, to the said screw.

Where it is desired to get some mottling, with more blending than indicated above, the second-mentioned material, instead of being relatively coarse, say a quarter inch mesh material, may be a powder or granular moist rennet casein of a slightly different color from that used in the first operation. It will be understood that the invention is not restricted to producing articles of two colors only, but three or more colors can be employed, and the proportion of the materials can be varied within rather wide limits.

Disks cut from the rods, by slicing the rods perpendicularly to their axis, are very suitable for the production of buttons or similar articles which show the mottling effect.

In place of water, other plasticizing agents can be employed, such as glycerine, glycerine and water, and various aqueous solutions.

In referring to different colors herein, black and white and natural casein color (so-called "blond" casein) are intended to be included.

I claim:

1. A process of making a mottled extruded casein plastic rod, which comprises alternately and intermittently feeding segregated amounts of differently colored moistened casein materials to an extrusion screw press and after the casein mass has left the screw, but while still in the said press, only slightly agitating the casein mass in a rotary plane perpendicular to the direction of longitudinal movement of the casein while being agitated, the rate of such rotary agitation being only sufficient to produce a spiral mottle in the casein plastic, and thereafter extruding the casein plastic from the press.

2. A process as in claim 1, in which the casein to form the ground work of the mottled plastic is fed to the extrusion operation in the condition of a moist pulverulent to fine granular non-plasticized mass, and a material of contrasting color is fed thereto as a coarsely granular plasticized material.

3. A process as in claim 1, in which the material to form the ground work of the mottled plastic is fed in substantially greater amount than the material to form the mottle.

4. A process as in claim 1, in which the casein to form the ground work and the casein to form the mottle are both fed to the extrusion operation as pulverulent to fine granular non-plasticized materials.

5. An apparatus for plasticizing and extruding casein plastic, and for producing a spiral mottle in the casein being extruded, which comprises a feed screw located within a casing, a shaft carried on the end of said screw and coaxial therewith, a perforated plate carried on said shaft, and an agitator lying in a plane substantially perpendicular to the said shaft and carried on said shaft and rotatable by rotation of said shaft, said agitator being spaced away from said perforated plate, said screw, shaft, perforated plate and agitator all being caused to rotate as a unit, about the axis of said screw and shaft, the greatest dimension of said agitator being the length perpendicular to said shaft.

6. An apparatus for plasticizing and extruding casein plastic in the form of rods having a mottle, which comprises a casing, a feed screw therein, a shaft carried on the end of said screw and coaxial therewith, an agitator lying in a plane perpendicular to the axis of said screw and shaft, said agitator being spaced away from the end of said screw, said screw, shaft and agitator being all mounted for rotation as a unit about the axis of said screw and shaft, the radial length of such agitator being greater than any other dimension thereof.

JOHN A. PARSONS.